United States Patent
Keller et al.

(10) Patent No.: US 7,153,921 B2
(45) Date of Patent: Dec. 26, 2006

(54) SYNTHESIS OF ELASTOMERIC CARBORANE-SILOXANES BY HYDROSILATION REACTIONS

(75) Inventors: Teddy M. Keller, Fairfax Station, VA (US); Manoj K. Kolel-Veetil, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 234 days.

(21) Appl. No.: 10/923,153

(22) Filed: Aug. 18, 2004

(65) Prior Publication Data

US 2005/0171317 A1    Aug. 4, 2005

Related U.S. Application Data

(60) Provisional application No. 60/541,017, filed on Feb. 3, 2004.

(51) Int. Cl.
*C08G 77/56* (2006.01)
(52) U.S. Cl. ......................................................... 528/5
(58) Field of Classification Search .................. 528/5
See application file for complete search history.

(56) References Cited

U.S. PATENT DOCUMENTS

| 5,272,237 | A  | 12/1993 | Keller et al. |
| 5,292,779 | A  | 3/1994  | Keller et al. |
| 5,969,072 | A  | 10/1999 | Keller et al. |
| 5,981,678 | A  | 11/1999 | Keller et al. |
| 6,187,890 | B1 | 2/2001  | Fehn et al.   |
| 6,225,247 | B1 | 5/2001  | Keller et al. |
| 2005/0171316 | A1 | 8/2005 | Keller et al. |

OTHER PUBLICATIONS

Houser et al, "Hydrosilation Routes to Materials with High Thermal and Oxidatives Stabilities", Journal of Polymer Science: Part A: Polymer Chemistry, vol. 36, pp. 1969-1972, 1998.

Tillack et al, "Catalytic Asymmetric Hydrosilylation of Butadiynes: A New Synthesis of Optically Active Allenes", Tetrahedron Letters, vol. 40, pp. 6567-6568, 1999.

Lewis et al, "Platinum-Catalyzed Hydrosilylation-Colloid Formation as the Essential Step", Journal of American Chemical Society, vol. 108, pp. 7228-7231, 1986.

*Primary Examiner*—Margaret G. Moore
(74) *Attorney, Agent, or Firm*—John J. Karasek; Joseph T. Grunkemeyer

(57) ABSTRACT

A crosslinked polymer and process of making it are disclosed. A copolymer having at least one alkyne group, carborane group, and alkylsiloxane group is reacted with a siloxane crosslinker in a hydrosilation reaction. This produces a crosslinked polymer where the crosslink sites are reacted alkyne groups.

33 Claims, 4 Drawing Sheets

WAVENUMBER (cm⁻¹)

SYNTHESIS OF ELASTOMERIC CARBORANE-SILOXANES BY HYDROSILATION REACTIONS

This application claims the benefit of U.S. Provisional Patent Application No. 60/541,017, filed on Feb. 3, 2004, incorporated herein by reference. U.S. patent application Ser. No. 10/874,000, and filed on Jun. 22, 2004 is incorporated herein by reference.

BACKGROUND OF THE INVENTION

1. Field of the Invention

The invention relates generally to siloxane-carborane polymers.

2. Description of the Prior Art

Carboranylenesiloxanes are highly sought after high temperature, thermally and thermo-oxidatively stable materials, which have been of particular interest to aerospace and defense industries especially for use in sealing assemblies for landing gears, flight control, and fuel systems and in coating insulations for cables (Dvornic et al., *High temperature Siloxane Elastomers*, Huthig & Wepf, Heidelberg, Germany 1990). (All referenced publications and patents are incorporated by reference.) There is also a high demand for such materials in the electronic industry in the manufacture of resist layers of computer chips. However, the existing carboranylenesiloxanes are generally low molecular weight polymers, a fact that has precluded their use in applications requiring high molecular weight materials (Papetti et al., "A New Series of Organoboranes 7. Preparation of Poly m-carboranylenesiloxanes," *J. Polym. Sci. Part A-1*, 4, 1623 (1966); Mayes et al., "Carborane Polymers 4. Polysiloxanes," *Polym. Sci. Part A-1*, 5, 365 (1967)). A solution to this problem was devised by the introduction of unsaturated crosslinkable units in such materials, which on curing yielded extended polymer networks of sufficient strength for various applications (Henderson et al., "Synthesis and Characterization of Poly(carborane-siloxane-acetylene)," *Macromolecules*, 27(6), 1660 (1994)). In practice, all such derivatives on curing have been known to be converted to plastics, which have thus restricted their use to mainly structural components (Bucca et al., "Oxidation-resistant thermosets derived from thermal copolymerization of acetylenic monomers containing boron and silicon," *J. Polym. Sci. Part A: Polym. Chem.*, 37(23), 4356 (1999); Homrighausen et al., "Synthesis and characterization of a silarylene-siloxane-diacetylene polymer and its conversion to a thermosetting plastic," *Polymer*, 43(9), 2619 (2002)). However, in applications involving high temperature coatings, sealings, composites, etc., there is a need for elastomeric materials. There is also a need for the curing to be effected in an expeditious manner under an ambient or inert atmosphere. The existing methodologies for the curing of carboranylenesiloxanes with unsaturated internal or terminal crosslinkable groups are by thermal crosslinking of the unsaturated groups or by the crosslinking of these groups by the use of chloroplatinic acid ($H_2PtCl_6 \cdot 6H_2O$), a hydrosilation catalyst (Houser et al., "Hydrosilation routes to materials with high thermal and oxidative stabilities," *J. Polym. Sci. Part A: Polym. Chem.*, 36(11), 1969 (1998); U.S. Pat. Nos. 5,981,678 and 6,225,247). The thermal curing reaction requires a temperature between 250–400° C. for several hours, and the hydrosilation reaction using chloroplatinic acid requires several hours or days. These constraints inherent in the existing systems, in addition to the alluded tendency of the materials to be converted into plastics on curing, consequently have precluded the use of these systems in elastomeric applications.

It is believed that the inability to control the extent of curing in these materials is the main reason for their plasticity on curing, as it results in inordinately extensive crosslinked systems. For example, on thermal curing a known polymer poly(carboranesiloxane-acetylene) is so extensively crosslinked that it inevitably converts into a plastic. Houser and Keller reported previously that an extensively crosslinked system was produced from the reaction of divinyl-terminated carboranesiloxane containing compound with poly(methylhydrosiloxane) in the presence of a hydrosilation catalyst resulting in the formation of a plastic. In this case, the unsuitability of the product's characteristic (brittleness) is compounded by the fact that a reaction time of several days was required to complete the curing. The long cure time is due to an inherent deficiency in the catalyst, which is an outcome of its associated mechanism. It has been well established that a hydrosilation catalyst such as chloroplatinic acid functions as a heterogeneous catalyst (Lewis et al., "Platinum-catalyzed hydrosilylation—colloid formation as the essential step," *J. Am. Chem. Soc.*, 108(23), 7228 (1986)). The Pt metal is converted into a colloidal form during the induction step and the catalysis occurs at the colloidal Pt. Unfortunately, chloroplatinic acid forms larger colloidal particles compared to other heterogeneous hydrosilation catalysts such as the Karstedt catalyst, $Pt[COD]_2$, etc, which can form very fine Pt colloids. Thus, the latter catalysts are infinitely superior to chloroplatinic acid, and hence, facilitate hydrosilation reactions in an expeditious manner. It is also known that these heterogeneous hydrosilation catalysts require the presence of $O_2$ to perform hydrosilation and hence, would not be effective as catalysts under an inert atmosphere (Lewis, "On the mechanism of metal colloid catalyzed hydrosilylation: proposed explanations for electronic effects and oxygen cocatalysis," *J. Am. Chem. Soc.*, 112(16), 5998 (1990)). For applications that have to be carried out under an inert atmosphere such as in composite fabrication or repair, this necessity of the heterogeneous catalysts for $O_2$ precludes their use as catalysts.

In the literature, there is a plethora of examples of homogeneous hydrosilation catalysts especially of Pt and Rh metals (Skoda-Foldes et al. "Homogeneous Catalytic Hydrosilylation of the C=C Double Bond in the Presence of Transition-Metal Catalysts," *J. Organomet. Chem.*, 408(3), 297 (1991)). These catalysts have been established to perform hydrosilation reactions under an inert atmosphere. For example, homogeneous catalysts such as $Pt(PPh_3)_4$, $PtCl_2(PPh_3)_2$, $RhCl(PPh_3)_3$, $RhCl_3 \cdot 3H_2O$, $Rh(PPh_3)_3Cl$, etc. are known to facilitate a wide range of hydrosilation reactions under an inert atmosphere. Some of these reactions, even though being not as fast as the ones catalyzed by heterogeneous catalysts such as Karstedt or $Pt(COD)_2$, do proceed at an appreciable rate. Another homogeneous catalyst [Rh(COD)Cl]$_2$ is known to catalyze the hydrosilation of butadiynes, which are close analogues of diacetylenes (Kusumoto et al., "Hydrosilylation of 1,4-Bis(trimethylsilyl)-1,3-butadiyne," *Chem. Lett.* 9, 1405 (1985); Tillack et al., "Hydrosilylierung von symmetrisch disubstituierten Alkinen und Butadiinen mit $L_2Ni(0)$-Butadiin-Komplexen [L=Ph$_3$P, ((o-Tol-O))$_3$P] als Katalysatoren," *J. Organomet. Chem.*, 532(1–2), 117 (1997); Tillack et al., "Catalytic Asymmetric Hydrosilylation of Butadiynes: A New Synthesis of Optically Active Allenes," *Tetrahedron Lett.*, 40(36), 6567 (1999)).

An example of a homogeneous hydrosilation catalyst that affects the catalysis at a rate that is comparable to that of heterogeneous hydrosilation catalysts is platinum diacetylacetonate (Pt(acac)$_2$), which functions under photochemical conditions. It is known to expediently and efficiently catalyze the hydrosilation of olefins in the presence of wavelengths of >350 nm (Lewis et al., "Platinum(II) Bis(β-diketonates) as Photoactivated Hydrosilation Catalysts," *Inorg. Chem.*, 34(12), 3182 (1995); Wang et al., "Photoactivated hydrosilylation reaction of alkynes," *J. Organomet. Chem.*, 665(1–2), 1 (2003)). An irradiation of an olefin and silane mixture in CH$_2$Cl$_2$ containing the catalyst with wavelengths of >350 nm for 10 min at ambient temperature is found sufficient to cause a high conversion of the olefin to the hydrosilated product. Another photochemical catalyst, which causes the hydrosilation of olefins expediently at mild temperatures, is Fe(CO)$_5$ (Randolph et al. "Photochemical reactions of (η$^5$-pentamethylcyclopentadienyl)dicarbonyliron alkyl and silyl complexes: reversible ethylene insertion into an iron-silicon bond and implications for the mechanism of transition-metal-catalyzed hydrosilation of alkenes," *J. Am. Chem. Soc.*, 108(12), 3366 (1986)).

SUMMARY OF THE INVENTION

The invention comprises a crosslinked polymer comprising a plurality of linear backbones and one or more crosslinking groups. The crosslinking group comprises the formula *—(SiR$_2$—O)$_r$—SiX$_2$—(O—SiR$_2$)$_r$—*. *— represents a bond between the crosslinking group and the backbone. Each X is independently selected from the group consisting of —R', —(O—SiR$_2$)$_r$—H, and —(O—SiR$_2$)$_r$—*. Each R and each R' is independently selected from the group consisting of alkyl, aryl, alkylaryl, haloalkyl, haloaryl, and mixtures thereof. Each r is an independently selected integer greater than or equal to 1. The backbone comprises at least one of each of the groups —(C≡C)$_m$—, —C$_b$—, and —SiR$_2$—(O—SiR$_2$)$_n$—. C$_b$ is a carboranyl group. Each m and each n is an independently selected integer greater than or equal to 1. (C≡C)$_m$ represents a chain of m acetylene or acetylene-derived groups, each independently selected from the group consisting of

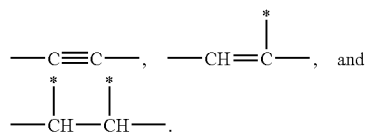

The invention further comprises a process of making a crosslinked polymer comprising the steps of: providing a copolymer, providing a siloxane crosslinker, and reacting the copolymer with the siloxane crosslinker in the presence of a hydrosilation catalyst. The copolymer comprises at least one of each of the groups —(C≡C)$_m$—, —C$_b$—, and —SiR$_2$—(O—SiR$_2$)$_n$—. C$_b$, m, and n are as defined above. (C≡C)$_m$ represents an acetylene group when m is 1 and conjugated acetylene groups when m is greater than 1. The silane crosslinker comprises the formula H—(SiR$_2$—O)$_r$—SiX$_2$—(O—SiR$_2$)$_r$—H. Each X is independently selected from the group consisting of —R' and —(O—SiR$_2$)$_r$—H. R, R', and r are as defined above.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE EXAMPLE EMBODIMENTS

Figure 1:
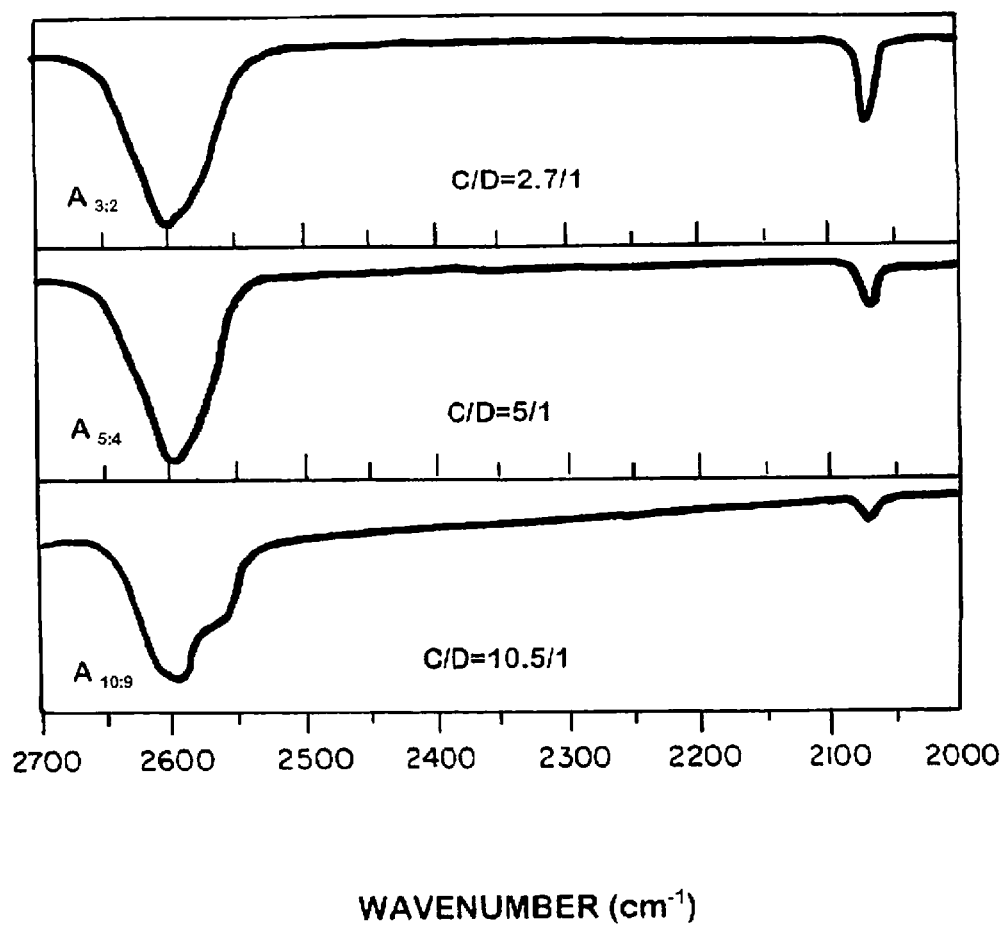
FIG. 1 shows IR spectra for $A_{3:2}$, $A_{5:4}$, and $A_{10:9}$.

The hydrosilation reactions of this invention between carborane-siloxane copolymers, containing acetylene groups, and branched or unbranched siloxane crosslinkers in the presence of homogeneous or heterogeneous hydrosilation catalysts may produce high performance elastomeric materials of thermally and thermo-oxidatively stable carboranylenesiloxane network systems.

Advantages of the invention may include: (1) the retention of elasticity in the cured carboranylenesiloxane network polymers, (2) the enhancement in the rate of curing, (3) the versatility of the reactants and the reaction conditions, (4) the ability to tailor the properties of the elastomeric cured polymers, (5) the use of liquid precursors that can be readily formulated into shaped components, (6) the potential for repair of carbon-based components in outer space, (7) the curing or conversion to elastomers under ambient conditions in either inert or oxidizing conditions, and (8) the fabrication of elastomeric high temperature composite components.

The synthetic scheme affords a method for varying the concentration of carborane-siloxane and crosslinked siloxane-containing units in the elastomer by using advanced curing catalytic additives. Through crosslinking under ambient and photochemical conditions, the physical properties of the corresponding elastomers can be tailored. The network elastomeric systems show enhanced thermo-oxidative stability and may be used for structural and coating applications. With the uses of curing additives of this invention, elastomeric components can be readily fabricated under ambient conditions in both inert and oxidizing environments.

In the first step of the process, a copolymer as described above is provided. Examples 1–7 illustrate various methods of making the copolymer. In various embodiments, the parameters may be, but are not limited to, every m is 2, and every n is 1 or 2. A suitable carboranyl group is —CB$_{10}$H$_{10}$C—, commonly known as carborane, which occurs in o- (1,2-), m- (1,7-), and p- (1,10-) forms. A suitable R group is, but is not limited to, methyl. More than one copolymer can also be used. Examples of copolymers are shown in Eqs. (1)–(4). Where shown, each p, q, and w is an independently selected integer greater than or equal to 1. By controlling which reactant is in excess, the terminal group can be determined. An excess of an acetylene compound can result in Eq. (2).

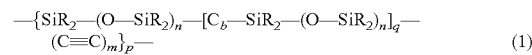

(1)

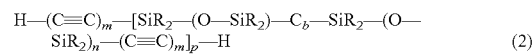

(2)

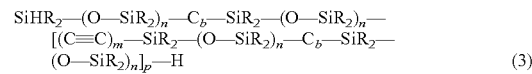

(3)

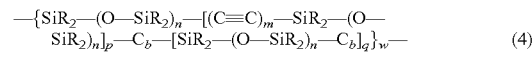

(4)

A multi-step process can be used to make an alternating copolymer as in Eq. (3), or block copolymer as in Eq. (4).

In both methods, care may be taken to keep the reaction media as concentrated as possible to promote chain extension over cyclization. For example, in a first flask of an alternating-copolymer synthesis, dilithiocarborane is prepared by the addition of lithium diisopropylamide to m-carborane in THF. However, before the dichlorosiloxane is added to form the dichloro-terminated trisiloxane-carborane prepolymers, the solvents (THF plus the heptane/THF/ethylbenzene in which the LDA is dissolved) are removed by high vacuum and the solid redissolved in a minimal quantity of THF. Cyclization of carborane-siloxanes has been documented and some evidence may be observed here in the form of low (~10%) char yields in thermogravimetric analysis of the alternating copolymers prepared before adding the concentration step to the synthetic procedure.

A more transparent copolymer may be made keeping the reaction mixture below a temperature of about −50° C. or −70° C. when making the copolymer. This can be done by reacting hexachlorobutadiene with n-butyl lithium, while maintaining the reaction mixture at a temperature below about −50° C. This is followed by reacting the resulting dilithiodiacetylene with a chlorosiloxane, such as am-carborane with two oligomeric dimethylsiloxyl groups terminating with a chloro group, initially at a temperature below about −50° C. and allowing the reaction mixture to warm to room temperature without external heating.

Infrared spectra contain absorptions characteristic of each of the three structural components in these copolymers. Carboranes are represented by the B—H stretch at 2597 $cm^{-1}$, diacetylenes by the C≡C stretch at 2071 $cm^{-1}$, and siloxanes by the Si—O stretch at 1059 $cm^{-1}$. Other absorptions include those due to C—H and Si—C groups in the siloxane units. Major peaks of the $^1H$ and $^{13}C$ NMR spectra are also characteristic of the three major segments of these polymers. Numerous minor peaks also appear in the NMR spectra and are attributed to a variety of end groups and the polydispersity of these relatively low molecular-weight polymers. The carborane carbons appear at 68.3 ppm in the $^{13}C$ NMR spectra, indicating complete reaction (unreacted carborane carbons appear at 55 ppm).

In the second step of the process, a siloxane crosslinker as described above is provided. The siloxane crosslinker can be described as having a central silicon atom bonded to at least two hydrogen-terminated siloxane groups or chains. The remaining bonding sites on the central silicon are occupied by X groups. When X is an R' group, it can be, but is not limited to, methyl or phenyl. Examples of siloxane crosslinkers are tetrakis(dimethylsiloxy)silane, 1,1,3,3,5,5,7,7-octamethyltetrasiloxane, 1,1,3,3,5,5-hexamethyltrisiloxane, $SiR'_2[(O—SiR_2)_r—H]_2$, $SiR'[(O—SiR_2)_r—H]_3$, $Si[(O—SiR_2)_r—H]_4$, and combinations thereof. Each r may be, but is not limited to, 1 or 2. Such crosslinkers may be commercially available. More than one siloxane crosslinker can also be used.

In the final step of the process, the copolymer is reacted with the siloxane crosslinker in the presence of a hydrosilation catalyst. This can form bonds between the (C≡C) groups in the copolymer and the terminal silicon atoms in the siloxane crosslinker. The curing of the copolymers using branched or unbranched siloxane crosslinkers can be performed under ambient conditions in either an oxidizing or an inert atmosphere using an appropriate catalyst. The reaction may occur by homogenous hydrosilation, non-aqueous heterogeneous hydrosilation, aqueous heterogeneous hydrosilation, or photochemical hydrosilation. Proper selection of the catalyst may be based upon its efficacy in a particular reaction condition that produces rapid curing. Suitable hydrosilation catalysts include, but are not limited to, Karstedt catalyst, Speier's catalyst, chloroplatinic acid, $Pt(COD)_2$, $Pt(PPh_3)_4$, $PtCl_2(PPh_3)_2$, $[Rh(COD)Cl]_2$, $PtCl_2(PhCN)_2$, $PtCl_2(diop)$, $PtCl_2(dppb)$, $RhCl(PPh_3)_3$, $Cp^*Rh(C_2H_4)(SiR_3)H$, $RhCl_3 \cdot 3H_2O$, $Rh(PPh_3)_3Cl$, $[Cp^*Rh]_2Cl_4$, $[Cp^*Rh_2]Cl_3H$, $\{[Cp^*Rh]_2(OH)_3\}^+$, $Me_2SiCp^*_2Th(n-Bu)_2$, $Pt(acac)_2$, and $Fe(CO)_5$. More than one catalyst can also be used.

The dramatic enhancement in curing rate by the heterogeneous Karstedt catalyst and by the homogeneous $Pt(acac)_2$ may be the result of their associated catalytic mechanisms. The formation during the induction step of much finer Pt colloids in the case of the Karstedt catalyst, when compared to chloroplatinic acid, can dramatically enhance the rate of curing. While the catalysis was found to require up to 10 days with the latter, the former affords the same reaction instantaneously. By controlling the concentration of the catalyst and other reaction conditions, it may also been possible to control the reaction rate to any desired value. The production of finer colloidal particles may also be beneficial in the formation of void-free networks, which are generally not attained by the chloroplatinic acid-catalyzed curing. The utilized catalyst $Pt(acac)_2$ also affords a curing rate similar to that of the Karstedt catalyst.

The versatility of the hydrosilation reactions of this invention is shown by the range of reaction conditions and reactants that have been used for the production of cured network systems. The curing can be conducted in an oxidizing or an inert atmosphere. The reactions may be performed using neat reagents and under ambient conditions. The hydrosilation reactions can tolerate a broad range of functionalities and can also be conducted under a specific reaction condition such as a photochemical condition.

For controlling the exothermicity of the reaction and for uniformity during processing of the product, hexane may be used as a reaction medium. The hexane should be dry, as residual moisture can reduce the efficiency of hydrosilation. It has been well documented that the presence of moisture can lead to an increase in the formation of Si—Si products and $H_2$ during the catalyst initiation process. It can also poison the catalyst and introduce voids in the products.

The siloxane units can impart elasticity to the starting copolymers. The hydrosilation reactions can facilitate these transformations in an expeditious manner, in either an oxidizing or an inert atmosphere and at ambient temperature. The materials of this invention can thus be used in the fabrication of high temperature fiber reinforced elastomeric composite components for military and domestic applications.

The result of the process can be the crosslinked polymer described above. The crosslinked polymer is made up of the copolymer, where some of the acetylene groups have reacted with the crosslinker, which is converted to the crosslinking group. Example crosslinking groups include, but are not limited to, $Si[O—Si(CH_3)_2H]_2[O—Si(CH_3)_2—*]_2$, $Si[O—Si(CH_3)_2H][O—Si(CH_3)_2—*]_3$, $Si[O—Si(CH_3)_2—*]_4$, $*—Si(CH_3)_2—O—Si(CH_3)_2—O—Si(CH_3)_2—*$, $*—Si(CH_3)_2—O—Si(CH_3)_2—O—Si(CH_3)_2—O—Si(CH_3)_2—*$, $SiR'_2[(O—SiR_2)_r—*]_2$, $SiR'[(O—SiR_2)_r—*]_3$, and $Si[(O—SiR_2)_r—*]_4$. When the copolymer comprises diacetylene groups, any of the (C≡C)$_m$ groups in the crosslinked polymer may be selected from any formula in Eq. (5).
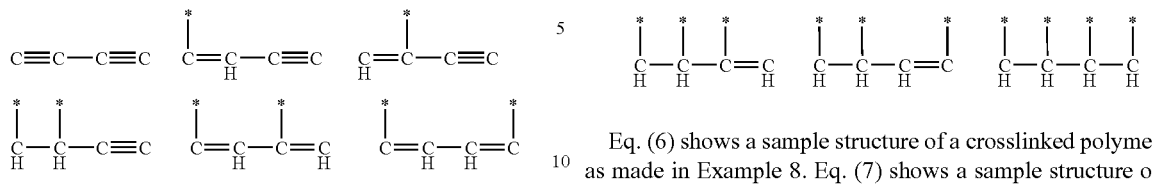
Eq. (6) shows a sample structure of a crosslinked polymer as made in Example 8. Eq. (7) shows a sample structure of a crosslinked polymer as made in Example 14.
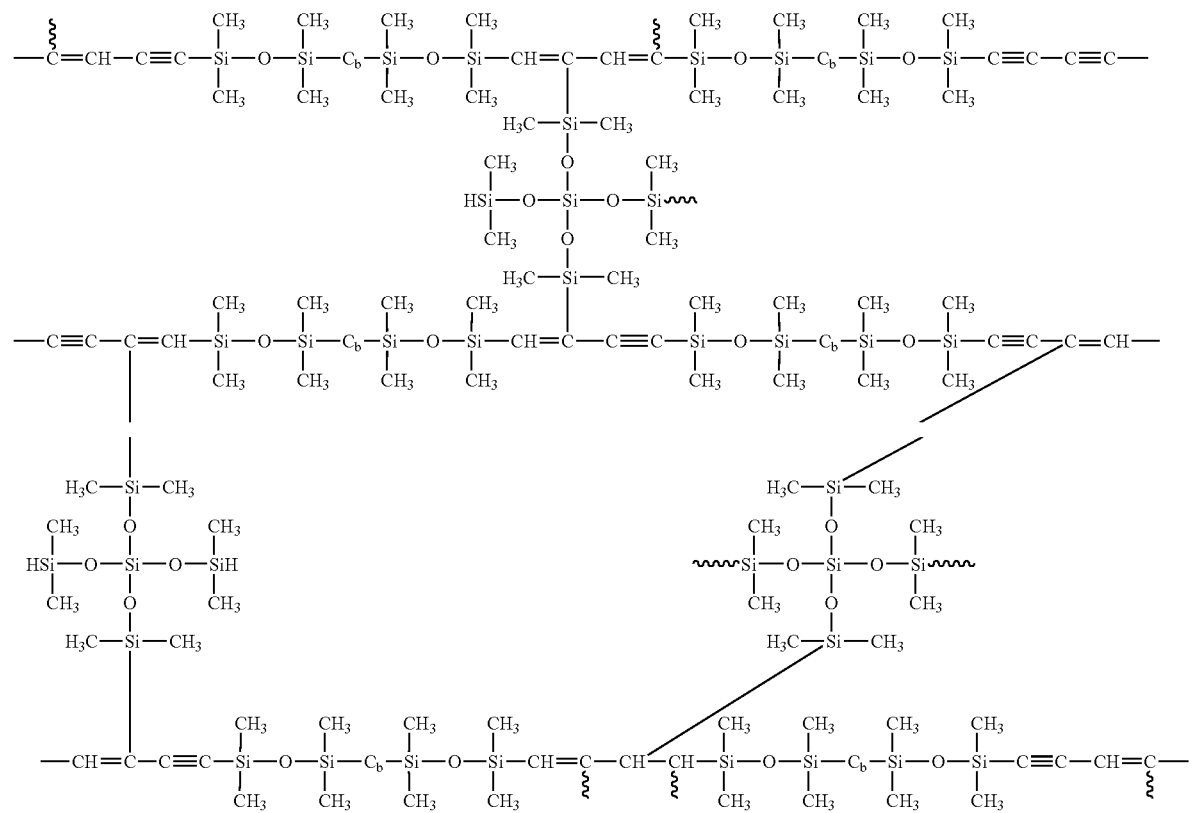
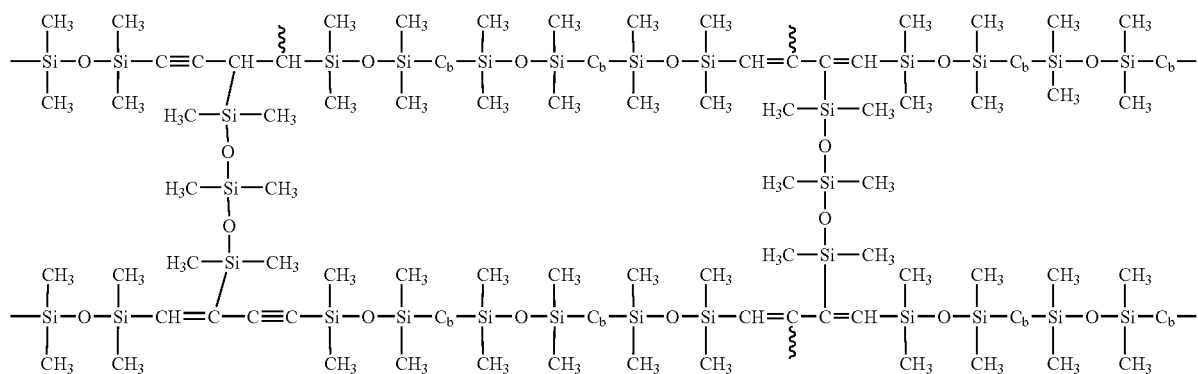

The compound may have elastomeric properties, depending on the groups used and the length of the siloxane groups. The retention of elasticity may be caused by the introduction of flexible siloxane groups in the carboranylenesiloxane precursors and the utilization of flexible crosslinkers with a lesser density of crosslinking sites for the curing reactions. As a result, the production of elastomeric, thermally and thermo-oxidatively stable carboranylenesiloxane networks can be achieved. This opens up several high temperature applications for the materials in the invention such as in coatings, composites, gaskets, etc. The compound may also be useful as a thermo-oxidative barrier or as an insulating material.

In a typical heterogeneous hydrosilation reaction of this invention, a suitable network may be formed when the carborane-siloxane precursor and the siloxane crosslinker are mixed in hexane at a Si—H:vinyl ratio of about 1.25:1 in the presence of the heterogeneous Karstedt catalyst. Alternatively, in a typical homogeneous reaction, a mixture of the carborane-siloxane precursor and the siloxane crosslinker at a Si—H:vinyl ratio of 1.25:1 can be placed in a quartz tube charged with a homogeneous catalyst such as $Pt(acac)_2$. The mixture can then be irradiated with a wavelength of >350 nm for 30 minutes to yield a well-formed network system.

Disiloxane moieties in the diacetylene-containing carboranylenesiloxanes may be substituted by trisiloxanes. Variations in the copolymer sequence are found to cause discernible differences in the thermal properties of the resultant networks prepared with trisiloxane-carborane-diacetylene ratios of 3:2:1, 5:4:1, and 10:9:1. There can be avenues for the systematic control of the material properties of polycarboranylenesiloxanes by judicious choice of the constituent siloxane, crosslinker (such as diacetylene), and the crosslinker placement in the network precursors.

Having described the invention, the following examples are given to illustrate specific applications of the invention. These specific examples are not intended to limit the scope of the invention described in this application.

Thermogravimetric analyses (TGA) were performed on a SDT 2960 simultaneous DTA-TGA analyzer. The differential scanning calorimetry (DSC) studies were performed on a DSC 2920 modulated DSC instrument. All thermal experiments were carried out with heating rates of 10° C./min and a nitrogen flow rate of 100 cc/min. Infrared (IR) spectra were obtained on a Nicolet Magna 750 Fourier transform infrared spectrometer. Solution-state $^1$H NMR and $^{13}$C NMR spectra were acquired on a Bruker AC-300 spectrometer and referenced to the internal solvent peak (chloroform-d, or $CDCl_3$).

EXAMPLE 1

Synthesis of diacetylene-terminated poly(diacetylene-disiloxane-m-carborane)s—A flame-dried 100 mL Schlenk flask, under argon, containing THF (5 mL) was cooled in a dryice/2-propanol bath (−78° C.). It was then treated with 7.29 mL of a 2.5 M n-butyl lithium solution (18.24 mmol) and was stirred for 15 min. After this period, 0.78 mL of hexachlorobutadiene (4.87 mmol, a slight excess when compared to 1,7-bis(chlorotetramethyldisiloxyl)m-carborane) was added drop wise via syringe in 20 min. After the addition was complete, the mixture was allowed to warm to room temperature and was stirred further for 3 h. The mixture was then cooled to −78° C. and 2.0 mL of 1,7-bis(chlorotetramethyldisiloxyl)m-carborane (4.43 mmol) was added via syringe. The mixture was then warmed to room temperature and was stirred further for 3 h. At this point, the mixture was cooled in an ice bath and was treated with 30 mL of cold saturated aqueous $NH_4Cl$ solution. The aqueous mixture was then extracted with $Et_2O$ (3×20 mL). The ether extracts were combined, dried over $Na_2SO_4$ and the dried extracts were filtered through celite. The filtered extracts were subjected to vacuum to remove the ether, which resulted in an oily brown product (2.3 g, 98%). IR (KBr, cm$^{-1}$): 3311($v_{C-H\ terminal}$), 3049 ($v_{C-H}$—$C_2H_3$), 2957 ($v_{C-H}$ Si—$CH_3$), 2591 ($v_{B-H}$), 2192 ($v_{C-C\ terminal}$), 2071 ($v_{C-C\ internal}$), 2038 ($v_{C-C\ terminal}$), 1412 ($v_{-CH2\ bend}$), 1258 ($v_{Si-C}$), 1077 ($v_{Si-O}$), 796 ($v_{Si-C\ bend}$). $^1$H NMR ($CDCl_3$, ppm): 0.090(Si—$CH_3$), 0.100 (Si—$CH_3$), 0.140 (Si—$CH_3$), 0.210 (Si—$CH_3$), 0.250 (Si—$CH_3$), 0.290 (Si—$CH_3$) and 3.2–1.3 (C—H, m-carborane). $^{13}$C{$^1$H} NMR ($CDCl_3$, ppm): 0.83 (Si—$CH_3$), 0.92 (Si—$CH_3$), 0.95 (Si—$CH_3$), 1.24 (Si—$CH_3$), 1.84 (Si—$CH_3$), 67.1 (m-$C_2B_{10}H_{10}$), 67.2 (m-$C_2B_{10}H_{10}$), 68.35 (m-$C_2B_{10}H_{10}$), 83.33 (—$C_2$), and 85.10 (—$C_2$), 86.21 (—$C_2$) and 86.72 (—$C_2$).

EXAMPLE 2

Synthesis of siloxane/ol-terminated poly(diacetylene-disiloxane-m-carboranylene)s—A flame-dried 100 mL Schlenk flask, under argon, containing THF (5 mL) was cooled in a dryice/2-propanol bath (−78° C.). It was then treated with 6.63 mL of a 2.5 M n-butyl lithium solution (16.58 mmol) and was stirred for 15 min. At this time, 0.71 ml of hexachlorobutadiene (4.43 mmol) was added drop wise via syringe in 20 min. After the addition was complete, the mixture was allowed to warm to room temperature and was stirred further for 3 h. The mixture was then cooled to −78° C. and 2.2 mL of 1,7-bis(chlorotetramethyldisiloxyl) m-carborane (4.87 mmol, slight excess when compared to hexachlorobutadiene) was added via syringe. The mixture was then warmed to room temperature and was stirred further for 3 h. After this period, the mixture was cooled in an ice bath and was treated with 30 mL of cold saturated aqueous $NH_4Cl$ solution. The aqueous mixture was then extracted with $Et_2O$ (3×20 mL). The ether extracts were combined, dried over $Na_2SO_4$ and the dried extracts were filtered through celite. The filtered extracts were subjected to vacuum to remove the ether, which resulted in an oily brown product (2.3 g, 98%). IR (KBr, cm$^{-1}$): 2960 ($v_{C-H}$ Si—$CH_3$), 2922 ($v_{C-H}$, Si—$CH_3$), 2595 ($v_{B-H)}$, 2070 ($v_{C-C}$), 1409 ($v_{-CH2\ bend}$), 1258 ($v_{Si-C}$), 1085 ($v_{Si-O}$), 800 ($v_{Si-C\ bend}$). $^1$H NMR ($CDCl_3$, ppm): 0.036 (Si—$CH_3$), 0.049 (Si—$CH_3$), 0.062 (Si—$CH_3$), 0.172 (Si—$CH_3$), 0.222 (Si—$CH_3$), and 0.267 (Si—$CH_3$). $^{13}$C{$^1$H} NMR ($CDCl_3$, ppm): −0.58 (Si—$CH_3$), −0.54 (Si—$CH_3$), 0.15 (Si—$CH_3$), 0.57 (Si—$CH_3$), 0.61 (Si—$CH_3$), 1.24 (Si—$CH_3$), 68.04 (m-$C_2B_{10}H_{10}$), 68.49 (m-$C_2B_{10}H_{10}$), 84.77 (—$C_2$), and 87.06 (—$C_2$).

EXAMPLE 3

An alternative method for the synthesis of diacetylene-containing poly carboranylenesiloxanes—All of the diacetylene-containing poly carboranylenesiloxanes synthesized and described in Examples 1, 2, and 4–7, are very dark and opaque. A synthetic methodology was developed to make them transparent and hence, lighter in color. A procedure that is applicable to all of them is described below specifically for the product made in Example 2.

A flame-dried 100 mL Schlenk flask, under argon, containing THF (5 mL) was cooled in a dryice/2-propanol bath (−78° C.). It was then treated with 6.63 mL of a 2.5 M n-butyl lithium solution (16.58 mmol) and was stirred for 15 min. At this time, 0.71 mL of hexachlorobutadiene (4.43 mmol) was added drop wise via syringe in 25 min. After the addition was complete, the mixture was stirred at this temperature for 20 min. 2.2 mL of 1,7-bis(chlorotetramethyldisiloxyl)m-carborane (4.87 mmol, slight excess when compared to hexachlorobutadiene) was then added via syringe in 5 min. The mixture was then allowed to warm to room temperature in 4 hr, by when it had a pale brown appearance, much lighter than the dark brown appearance that was observed when the two reagents were mixed as in Example 2. The mixture was stirred further for 18 h at room temperature. The formation of a large amount of a pale LiCl precipitate was observed. After this period, the mixture was cooled again to −78° C. and a few drops of dichlorotetramethyldisiloxane were added and stirred for two more hours after warming the mixture to room temperature. The mixture, which was pale brown in color, was then cooled in an ice bath and was treated with 30 mL of cold saturated aqueous NH$_4$Cl solution. The aqueous mixture was extracted with Et$_2$O (3×20 mL). The ether extracts were combined, dried over Na$_2$SO$_4$ and activated charcoal and the dried extracts were filtered through celite. The filtered extracts were subjected to vacuum to remove the ether, which resulted in a transparent, pale golden yellow viscous oily product (2.3 g, 98%). IR (KBr, cm$^{-1}$): 2960 ($v_{C-H}$ Si—CH$_3$), 2922 ($v_{C-H}$, Si—CH$_3$), 2595 ($v_{B-H}$), 2070 ($v_{C-C}$), 1409 ($v_{-CH2\ bend}$), 1258 ($v_{Si-C}$), 1085 ($v_{Si-O}$), 800 ($v_{Si-C\ bend}$). $^1$H NMR (CDCl$_3$, ppm): 0.036 (Si—CH$_3$), 0.049 (Si—CH$_3$), 0.062 (Si—CH$_3$), 0.172 (Si—CH$_3$), 0.222 (Si—CH$_3$), and 0.267 (Si—CH$_3$). $^{13}$C{$^1$H} NMR (CDCl$_3$, ppm): −0.58 (Si—CH$_3$), −0.54 (Si—CH$_3$), 0.15 (Si—CH$_3$), 0.57 (Si—CH$_3$), 0.61 (Si—CH$_3$), 1.24 (Si—CH$_3$), 68.04 (m-C$_2$B$_{10}$H$_{10}$), 68.49 (m-C$_2$B$_{10}$H$_{10}$), 84.77 (—C$_2$), and 87.06 (—C$_2$).

Using the clearer product, it was easier to follow the color changes during a hydrosilation of the diacetylene functionality catalyzed by [Rh(μ-Cl)(COD)]$_2$ (Example 11, etc.). Also, a clearer, diacetylene-containing carboranylenesiloxane could result in its application as a thermo- or mechanochromic sensor. It is well documented that diacetylene-containing polymers on curing, produce network polymers in which the visible absorptions shift to shorter wavelengths (blue shifts) on application of force (mechanochromic) or temperature (thermochromic). (Rubner, U.S. Pat. No. 4,916, 211, incorporated herein by reference.)

EXAMPLE 4

Synthesis of diacetylene-diluted alternating copolymers, poly(m-carborane-disiloxane-diacetylene)s—Diacetylene-diluted alternating poly(m-carborane-disiloxane-diacetylene)s with diacetylene:disiloxane:carborane ratios of 1:3:2, 1:5:4 and 1:10:9 were synthesized by using the general procedure described below for the 1:3:2 oligomer. The reaction was initiated in two flasks, the contents of which were later mixed to yield the product.

Flask #1: THF (3.5 mL) and n-butyl lithium (3.134 mL, 2.52 M, 7.897 mmol) were transferred to a flame-dried 50 mL flask and the mixture was cooled to −78° C. in a dry ice/2-propanol bath. While stirring, 0.309 mL of hexachlorobutadiene (1.974 mmol) was added drop wise over 15 min. After the addition, the reaction mixture was warmed to room temperature and stirred for 4 h.

Flask #2: A flame-dried 200 mL flask under argon was charged with 0.5695 g of m-carborane (3.949 mmol). THF (1 mL) was transferred to this flask and m-carborane was dissolved in it. The reaction flask was immersed in an ice bath and 3.988 mL of a 2.0 M lithium diisopropylamide solution in THF (7.967 mmol) was added drop wise via syringe. After the addition was complete; the mixture was warmed to room temperature and stirred for 2 h. The volatiles were then removed with high vacuum and the solid residue was redissolved in THF (5 mL). The solution was then cooled with an ice bath and 1.153 mL of 1,3-dichlorotetramethyldisiloxane (5.923 mmol) was added drop wise. The ice bath was removed and the reaction was allowed to proceed for another 5 h.

The contents of flask #2 were cooled in an ice bath. The contents of flask #1 were then cannulated into flask #2. The reaction was allowed to proceed overnight and then poured into an aqueous saturated NH$_4$Cl solution (30 mL). The aqueous mixture was extracted with Et$_2$O (3×20 mL). The ether extracts were then combined, dried over Na$_2$SO$_4$ and the dried extracts were filtered through celite. The filtered extracts were subjected to vacuum to remove the ether, which resulted in an oily brown product (1.9 g, 100%). IR (KBr, cm$^{-1}$): 2959 ($v_{C-H}$ Si—CH$_3$), 2921 ($v_{C-H}$ Si—CH$_3$), 2597 ($v_{B-H}$), 2071 ($v_{C-C}$), 1409 ($v_{-CH2\ bend}$), 1264 ($v_{Si-C}$), 1059 ($v_{Si-O}$), 801 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25–0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 5

Synthesis of diacetylene-diluted block copolymers, poly(m-carborane-disiloxane-diacetylene)s—Diacetylene-diluted block poly(m-carborane-disiloxane-diacetylene)s with diacetylene:disiloxane:carborane ratios of 1:3:2, 1:5:4 and 1:10:9 were synthesized by using the general procedure described below for the 1:3:2 oligomer. The reaction was initiated in two flasks, the contents of which were later mixed to yield the product.

Flask #1: THF (3.5 mL) and n-butyl lithium (2.77 mL, 2.5 M, 6.92 mmol) were transferred to a flame-dried 50 mL flask and the mixture was cooled to −78° C. in a dry ice/2-propanol bath. While stirring, 0.27 mL of hexachlorobutadiene (1.73 mmol) was added drop wise over 15 min. After the addition, the reaction mixture was warmed to room temperature and stirred for 4 h. The mixture was cooled again to −78° C. and 0.67 mL of 1,3-dichlorotetramethyldisiloxane (3.46 mmol) was added drop wise via syringe. The mixture was then warmed to room temperature and stirred for 2 h.

Flask #2: A flame-dried 200 mL flask under argon was charged with 0.5 g of m-carborane (3.47 mmol). THF (1 mL) was transferred to this flask and m-carborane was dissolved in it. The reaction flask was immersed in an ice bath and 3.5 mL of a 2.0 M lithium diisopropylamide solution in THF (7.01 mmol) was added drop wise via syringe. After the addition was complete, the mixture was warmed to room temperature and stirred for 2 h. The volatiles were then removed with high vacuum and the solid residue was redissolved in THF (2 mL). The solution was then cooled with an ice bath and 0.34 mL of 1,3-dichlorotetramethyldisiloxane (1.73 mmol) was added drop wise. The ice bath was removed and the reaction was allowed to proceed for another 3 h.

The contents of flask #2 were cooled in an ice bath. The contents of flask #1 were then cannulated into flask #2. The reaction was allowed to proceed overnight and then poured into an aqueous saturated NH$_4$Cl solution (30 mL). The aqueous mixture was extracted with Et$_2$O (3×20 mL). The ether extracts were then combined, dried over Na$_2$SO$_4$ and the dried extracts were filtered through celite. The filtered extracts were subjected to vacuum to remove the ether, which resulted in an oily brown product (1.9 g, 100%). IR (KBr, cm$^{-1}$): 2959 ($v_{C-H}$ Si—CH$_3$), 2921 ($v_{C-H}$ Si—CH$_3$), 2597 ($v_{B-H}$), 2071 ($v_{C-C}$), 1409 ($v_{-CH2\ bend}$), 1264 ($v_{Si-C}$), 1059 ($v_{Si-O}$), 801 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25–0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 6

Synthesis of diacetylene-diluted alternating copolymers, poly(m-carborane-trisiloxane-diacetylene)s—Diacetylene-diluted alternating poly(m-carborane-trisiloxane-diacetylene)s with diacetylene:trisiloxane:m-carborane ratios of 1:3:2, 1:5:4 and 1:10:9 (referred to as A$_{3:2}$, A$_{5:4}$, and A$_{10:9}$) were synthesized by using the general procedure described below for the 1:3:2 oligomer. The reaction was initiated in two flasks, the contents of which were later mixed to yield the product.

Flask #1: THF (3.5 mL) and n-butyl lithium (3.134 mL, 2.52 M, 7.897 mmol) were transferred to a flame-dried 50 mL flask and the mixture was cooled to −78° C. in a dry ice/2-propanol bath. While stirring, 0.309 mL of hexachlorobutadiene (1.974 mmol) was added drop wise over 15 min. After the addition, the reaction mixture was warmed to room temperature and stirred for 4 h.

Flask #2: A flame-dried 200 mL flask under argon was charged with 0.5695 g of m-carborane (3.949 mmol). THF (1 mL) was transferred to this flask and m-carborane was dissolved in it. The reaction flask was immersed in an ice bath and 3.988 mL of a 2.0 M lithium diisopropylamide solution in THF (7.967 mmol) was added drop wise via syringe. After the addition was complete, the mixture was warmed to room temperature and stirred for 2 h. The volatiles were then removed with high vacuum and the solid residue was redissolved in THF (5 mL). The solution was then cooled with an ice bath and 1.614 mL of 1,5-dichlorohexamethyltrisiloxane (5.923 mmol) was added drop wise. The ice bath was removed and the reaction was allowed to proceed for another 5 h.

The contents of flask #2 were cooled in an ice bath. The contents of flask #1 were then cannulated into flask #2. The reaction was allowed to proceed overnight and then poured into an aqueous saturated NH$_4$Cl solution (30 mL). The aqueous mixture was extracted with Et$_2$O (3×20 mL). The ether extracts were then combined, dried over Na$_2$SO$_4$ and the dried extracts were filtered through celite. The filtered extracts were subjected to vacuum to remove the ether, which resulted in an oily brown product (1.9 g, 100%). IR (KBr, cm$^{-1}$): 2959 ($v_{C-H}$ Si—CH$_3$), 2921 ($v_{C-H}$ Si—CH$_3$), 2597 ($v_{B-H}$), 2071 ($v_{C-C}$), 1409 ($v_{-CH2\ bend}$), 1264 ($v_{Si-C}$), 1059 ($v_{Si-O}$), 801 ($v_{Si-C\ bend}$). $^1$H NMR (CDCl$_3$, ppm): 0.100 (Si—CH$_3$), 0.140 (Si—CH$_3$), 0.210 (Si—CH$_3$), 0.290 (Si—CH$_3$), 3.2–1.3 (C—H, m-carborane). $^{13}$C{$^1$H} NMR (CDCl$_3$, ppm): 0.48 (Si—CH$_3$), 0.83 (Si—CH$_3$), 0.95 (Si—CH$_3$), 1.85 (Si—CH$_3$), 68.30 (m-C$_2$B$_{10}$H$_{10}$), 85.10 (—C—C), and 86.8 (—C—C).

EXAMPLE 7

Synthesis of diacetylene-diluted block copolymers, poly(m-carborane-trisiloxane-diacetylene)s—Diacetylene-diluted block poly(m-carborane-trisiloxane-diacetylene)s with diacetylene:trisiloxane:m-carborane ratios of 1:3:2, 1:5:4 and 1:10:9 (referred to as B$_{3:2}$, B$_{5:4}$, and B$_{10:9}$) were synthesized by using the general procedure described below for the 1:3:2 oligomer. The reaction was initiated in two flasks, the contents of which were later mixed to yield the product.

Flask #1: THF (3.5 mL) and n-butyl lithium (2.77 mL, 2.5 M, 6.92 mmol) were transferred to a flame-dried 50 mL flask and the mixture was cooled to −78° C. in a dry ice/2-propanol bath. While stirring, 0.27 mL of hexachlorobutadiene (1.73 mmol) was added drop wise over 15 min. After the addition, the reaction mixture was warmed to room temperature and stirred for 4 h. The mixture was cooled again to −78° C. and 0.94 mL of 1,5-dichlorohexamethyltrisiloxane (3.46 mmol) was added drop wise via syringe. The mixture was then warmed to room temperature and stirred for 2 h.

Flask #2: A flame-dried 200 mL flask under argon was charged with 0.5 g of m-carborane (3.47 mmol). THF (1 mL) was transferred to this flask and m-carborane was dissolved in it. The reaction flask was immersed in an ice bath and 3.5 mL of a 2.0 M lithium diisopropylamide solution in THF (7.01 mmol) was added drop wise via syringe. After the addition was complete, the mixture was warmed to room temperature and stirred for 2 h. The volatiles were then removed with high vacuum and the solid residue was redissolved in THF (2 mL). The solution was then cooled with an ice bath and 0.47 mL of 1,5-dichlorohexamethyltrisiloxane (1.73 mmol) was added drop wise. The ice bath was removed and the reaction was allowed to proceed for another 3 h.

The contents of flask #2 were cooled in an ice bath. The contents of flask #1 were then cannulated into flask #2. The reaction was allowed to proceed overnight and then poured into an aqueous saturated NH$_4$Cl solution (30 mL). The aqueous mixture was extracted with Et$_2$O (3×20 mL). The ether extracts were then combined, dried over Na$_2$SO$_4$ and the dried extracts were filtered through celite. The filtered extracts were subjected to vacuum to remove the ether, which resulted in an oily brown product (1.9 g, 100%). IR (KBr, cm$^{-1}$): 2959 ($v_{C-H}$ Si—CH$_3$), 2921 ($v_{C-H}$ Si—CH$_3$), 2597 ($v_{B-H}$), 2071 ($v_{C-C}$), 1409 ($v_{-CH2\ bend}$), 1264 ($v_{Si-C}$), 1059 ($v_{Si-O}$), 801 ($v_{Si-C\ bend}$). $^1$H NMR (CDCl$_3$, ppm): 0.100 (Si—CH$_3$), 0.140 (Si—CH$_3$), 0.210 (Si—CH$_3$), 0.290 (Si—CH$_3$), 3.2–1.3 (C—H, m-carborane). $^{13}$C{$^1$H} NMR (CDCl$_3$, ppm): 0.48 (Si—CH$_3$), 0.83 (Si—CH$_3$), 0.95 (Si—CH$_3$), 1.85 (Si—CH$_3$), 68.30 (m-C$_2$B$_{10}$H$_{10}$), 85.10 (—C—C), and 86.8 (—C—C).

Direct spectral evidence for the successful dilution of the diacetylene groups in the copolymer structure is provided by infrared spectra (see FIG. 1). For each set of copolymers, the IR absorption intensities of diacetylene groups decrease with respect to that of the carborane groups as the S:C:D ratio goes from 3:2:1 to 10:9:1. A selected region of the infrared spectra are shown in FIG. 1 for alternating copolymer diacetylene-containing polycarboranylenesiloxanes, with trisiloxane-carborane-diacetylene ratios of 3:2:1 (A$_{3:2}$), 5:4:1 (A$_{5:4}$), and 10:9:1 (A$_{10:9}$). The diacetylene absorption (2071 cm$^{-1}$) decreases with respect to the carborane absorption (2597 cm$^{-1}$) in proceeding from A$_{3:2}$ to A$_{10:9}$. The C/D ratios refer to the absorption peak heights. Such spectra may be used to monitor the reaction of the diacetylene groups.

Molecular weights were determined by gel permeation chromatography using polystyrene standards and are presented in Table 1. For a given reactant ratio, the alternating copolymers exhibit slightly higher molecular weights than the block copolymers.

TABLE 1

GPC Molecular Weights

| copolymer | $M_n$ (kg/mol) | $M_w$ (kg/mol) |
|---|---|---|
| $A_{3:2}$ | 4.3 | 6.6 |
| $A_{5:4}$ | 3.3 | 5.4 |
| $A_{10:9}$ | 5.2 | 8.6 |
| $B_{3:2}$ | 3.4 | 6.2 |
| $B_{5:4}$ | 2.9 | 4.3 |
| $B_{10:9}$ | 4.1 | 6.7 |

EXAMPLE 8

Curing of the product from Example 1 with the cross-linker tetrakis(dimethylsiloxy)silane using Pt(acac)$_2$ catalyst (homogeneous catalysis)—A flame-dried quartz photochemical reaction tube was charged with 10 mg (0.0254 mmol) of Pt(acac)$_2$ under Ar in a dry box. 1 mL of CH$_2$Cl$_2$ was added to it to yield a pale yellow catalyst solution. In a separate vial, the product from Example 1 (0.2 g; 0.444 mmol) and tetrakis(dimethylsiloxy)silane (0.1 mL; 0.272 mmol) were stirred for two min to yield a mix with a Si—H:diacetylene ratio of 1.25:1. This mix was syringed into the catalyst solution under argon, and the reaction tube was inserted into a Rayonet Photochemical reaction instrument. The sample was irradiated for 30 min using a >300 nm (pyrex filtered) radiation while being constantly agitated by a stream of argon which was passed via needle. After this period, the irradiation was stopped and the quartz tube was taken out of the reactor. The formation of a cured gel was observed. Thermal properties: char yield at 1000° C. (in N$_2$): 78%, char yield at 1000° C. (in air): 90%, $T_g$: −32° C. The materials formed were thus found to be elastomeric and thermally and thermo-oxidatively stable.

EXAMPLE 9

Curing of the product from Example 1 with the cross-linker tetrakis(dimethylsiloxy)silane using Rh$_2$(COD)$_2$(μ-Cl)$_2$ catalyst (homogeneous catalysis)—A flame-dried 50 mL Schlenk flask was charged with 10 mg (0.0201 mmol) of Rh$_2$(COD)$_2$(μ-Cl)$_2$ under argon in a dry box. A 2 mL solution of 0.2 g of product from Example 1 (0.444 mmol) in anhydrous toluene was prepared in another flame-dried flask. This solution was transferred via cannula into the flask containing the catalyst. Using a 500 mL syringe, 0.1 mL of tetrakis(dimethylsiloxy)silane (0.272 mmol) was syringed into the mixture and it was introduced into an oil bath at 70° C. The reaction was instantaneous as evidenced by the darkening of the color of the mixture. The mixture was stirred for 30 min at this temperature and then the volatiles were removed with vacuum. A cured gel resulted. Thermal properties: char yield at 1000° C. (in N$_2$): 60%, char yield at 1000° C. (in air): 80%, $T_g$: below −70° C. The material formed was thus found to be elastomeric and thermally and thermo-oxidatively stable.

EXAMPLE 10

Curing of the product from Example 1 with the cross-linker 1,1,3,3,5,5,7,7-octamethyltetrasiloxane (1.02 mmol) using Pt(acac)$_2$ catalyst (homogeneous catalysis)—A flame-dried quartz photochemical reaction tube was charged with 10 mg (0.0254 mmol) of Pt(acac)$_2$ under Ar in a dry box. 1 mL of CH$_2$Cl$_2$ was added to it to yield a pale yellow catalyst solution. In a separate vial, the product from Example 1 (0.2 g; 0.444 mmol) and 0.18 mL of 1,1,3,3,5,5,7,7-octamethyltetrasiloxane (0.55 mmol) were stirred for two minutes to yield a mix with a Si—H:diacetylene ratio of 1.25:1. This mix was syringed into the catalyst solution under argon, and the reaction tube was inserted into a Rayonet Photochemical reaction instrument. The sample was irradiated for 30 min using a >300 nm (pyrex filtered) radiation while being constantly agitated by a stream of argon which was passed via needle. After this period, the irradiation was stopped and the quartz tube was taken out of the reactor. The formation of a cured gel was observed. Thermal properties: char yield at 1000° C. (in N$_2$): 78%, char yield at 1000° C. (in air): 90%, $T_g$: −32° C. The material formed was thus found to be elastomeric and thermally and thermo-oxidatively stable.

EXAMPLE 11

Curing of the product from Example 1 with the cross-linker 1,1,3,3,5,5,7,7-octamethyltetrasiloxane using Rh$_2$(COD)$_2$(μ-Cl)$_2$ catalyst (homogeneous catalysis)—A flame-dried 50 mL Schlenk flask was charged with 10 mg (0.0201 mmol) of Rh$_2$(COD)$_2$(μ-Cl)$_2$ under argon in a dry box. A 2 mL solution of 0.225 g of product from Example 1 (0.501 mmol) in anhydrous toluene was prepared in another flame-dried flask. This solution was transferred via cannula into the flask containing the catalyst. Using a 500 μL syringe, 0.33 mL of 1,1,3,3,5,5,7,7-octamethyltetrasiloxane (1.02 mmol) was syringed into the mixture and it was introduced into an oil bath at 70° C. The reaction was instantaneous as evidenced by the darkening of the color of the mixture. The mixture was stirred for 30 min at this temperature and then the volatiles were removed with vacuum. A cured gel resulted. Thermal properties: char yield at 1000° C. (in N$_2$): 60%, char yield at 1000° C. (in air): 80%, $T_g$: below −70° C. The material formed was thus found to be elastomeric and thermally and thermo-oxidatively stable.

EXAMPLE 12

Curing of the product from Example 2 with the cross-linker 1,1,3,3,5,5-hexamethyltrisiloxane using Rh$_2$(COD)$_2$(μ-Cl)$_2$ catalyst (homogeneous catalysis)—A flame-dried 50 mL Schlenk flask was charged with 10 mg (0.0201 mmol) of Rh$_2$(COD)$_2$(μ-Cl)$_2$ under argon in a dry box. A 2 mL solution of 0.241 g of product from Example 2 (0.556 mmol) in anhydrous toluene was prepared in another flame-dried flask. This solution was transferred via cannula into the flask containing the catalyst. Using a 500 μL syringe, 0.28 mL of 1,1,3,3,5,5-hexamethyltrisiloxane (0.501 mmol) was syringed into the mixture and it was introduced into an oil bath at 70° C. The reaction was instantaneous as evidenced by the darkening of the color of the mixture. The mixture was stirred for 30 min at this temperature and then the volatiles were removed with vacuum. A cured gel resulted. $T_g$: below −70° C. The material formed was thus found to be elastomeric.

EXAMPLE 13

Curing of the product from Example 4 with the cross-linker 1,1,3,3,5,5-hexamethyltrisiloxane using Rh$_2$(COD)$_2$(μ-Cl)$_2$ catalyst (homogeneous catalysis)—A flame-dried 50 mL Schlenk flask was charged with 10 mg (0.0201 mmol) of $Rh_2(COD)_2(\mu\text{-}Cl)_2$ under argon in a dry box. A 2 mL solution of 0.151 g of product from Example 4 (0.250 mmol) in anhydrous toluene was prepared in another flame-dried flask. This solution was transferred via cannula into the flask containing the catalyst. Using a 500 μL syringe, 0.13 mL of 1,1,3,3,5,5-hexamethyltrisiloxane (0.501 mmol) was syringed into the mixture and it was introduced into an oil bath at 70° C. The reaction was instantaneous as evidenced by the darkening of the color of the mixture. The mixture was stirred for 30 min at this temperature and then the volatiles were removed with vacuum. A cured gel resulted. $T_g$: below −70° C. The material formed was thus found to be elastomeric.

EXAMPLE 14

Curing of the product from Example 5 with the crosslinker 1,1,3,3,5,5-hexamethyltrisiloxane using $Rh_2(COD)_2(\mu\text{-}Cl)_2$ catalyst (homogeneous catalysis)—A flame-dried 50 mL Schlenk flask was charged with 10 mg (0.0201 mmol) of $Rh_2(COD)_2(\mu\text{-}Cl)_2$ under argon in a dry box. A 2 mL solution of 0.151 g of product from Example 5 (0.250 mmol) in anhydrous toluene was prepared in another flame-dried flask. This solution was transferred via cannula into the flask containing the catalyst. Using a 500 μL syringe, 0.13 mL of 1,1,3,3,5,5-hexamethyltrisiloxane (0.501 mmol) was syringed into the mixture and it was introduced into an oil bath at 70° C. The reaction was instantaneous as evidenced by the darkening of the color of the mixture. The mixture was stirred for 30 min at this temperature and then the volatiles were removed with vacuum. A cured gel resulted. $T_g$: below −70° C. The material formed was thus found to be elastomeric.

EXAMPLE 15

Curing of the product from Example 6 with the crosslinker 1,1,3,3,5,5-hexamethyltrisiloxane using $Rh_2(COD)_2(\mu\text{-}Cl)_2$ catalyst (homogeneous catalysis)—A flame-dried 50 mL Schlenk flask was charged with 10 mg (0.0201 mmol) of $Rh_2(COD)_2(\mu\text{-}Cl)_2$ under argon in a dry box. A 2 mL solution of 0.151 g of product from Example 6 (0.250 mmol) in anhydrous toluene was prepared in another flame-dried flask. This solution was transferred via cannula into the flask containing the catalyst. Using a 500 μL syringe, 0.13 mL of 1,1,3,3,5,5-hexamethyltrisiloxane (0.501 mmol) was syringed into the mixture and it was introduced into an oil bath at 70° C. The reaction was instantaneous as evidenced by the darkening of the color of the mixture. The mixture was stirred for 30 min at this temperature and then the volatiles were removed with vacuum. A cured gel resulted. $T_g$: below −70° C. The material formed was thus found to be elastomeric.

EXAMPLE 16

Curing of the product from Example 7 with the crosslinker 1,1,3,3,5,5-hexamethyltrisiloxane using $Rh_2(COD)_2(\mu\text{-}Cl)_2$ catalyst (homogeneous catalysis)—A flame-dried 50 mL Schlenk flask was charged with 10 mg (0.0201 mmol) of $Rh_2(COD)_2(\mu\text{-}Cl)_2$ under argon in a dry box. A 2 mL solution of 0.151 g of product from Example 7 (0.250 mmol) in anhydrous toluene was prepared in another flame-dried flask. This solution was transferred via cannula into the flask containing the catalyst. Using a 500 μL syringe, 0.13 mL of 1,1,3,3,5,5-hexamethyltrisiloxane (0.501 mmol) was syringed into the mixture and it was introduced into an oil bath at 70° C. The reaction was instantaneous as evidenced by the darkening of the color of the mixture. The mixture was stirred for 30 min at this temperature and then the volatiles were removed with vacuum. A cured gel resulted. $T_g$: below −70° C. The materials formed were thus found to be elastomeric.

Figure 2:
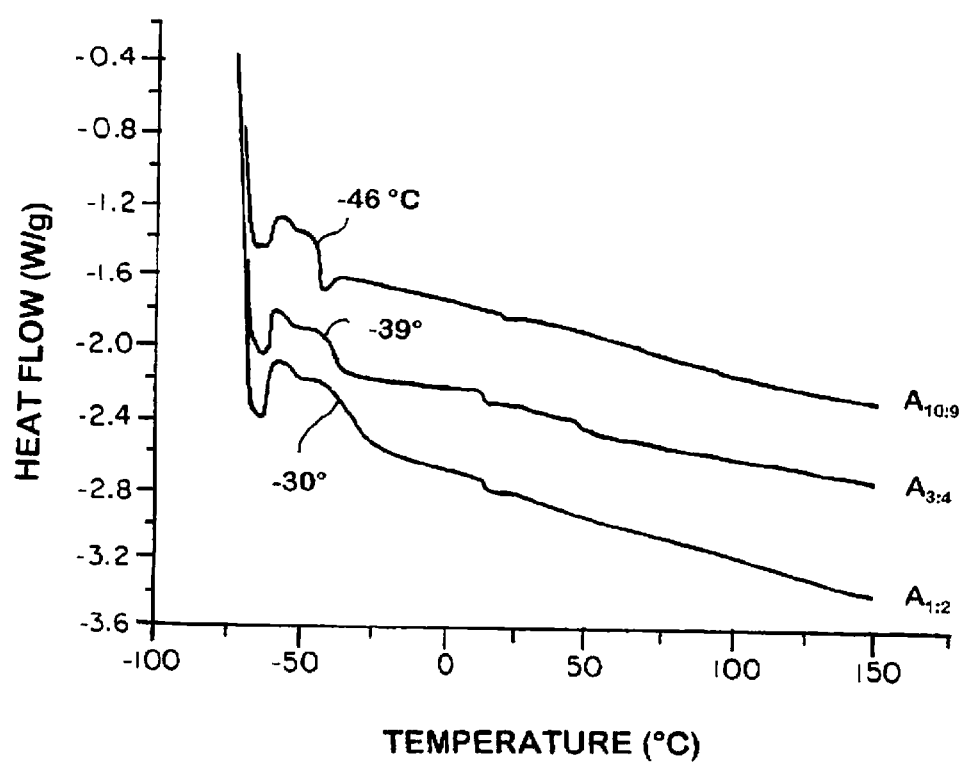
FIGS. 2 and 3 show DSC thermograms of crosslinked polymers.
Figure 3:
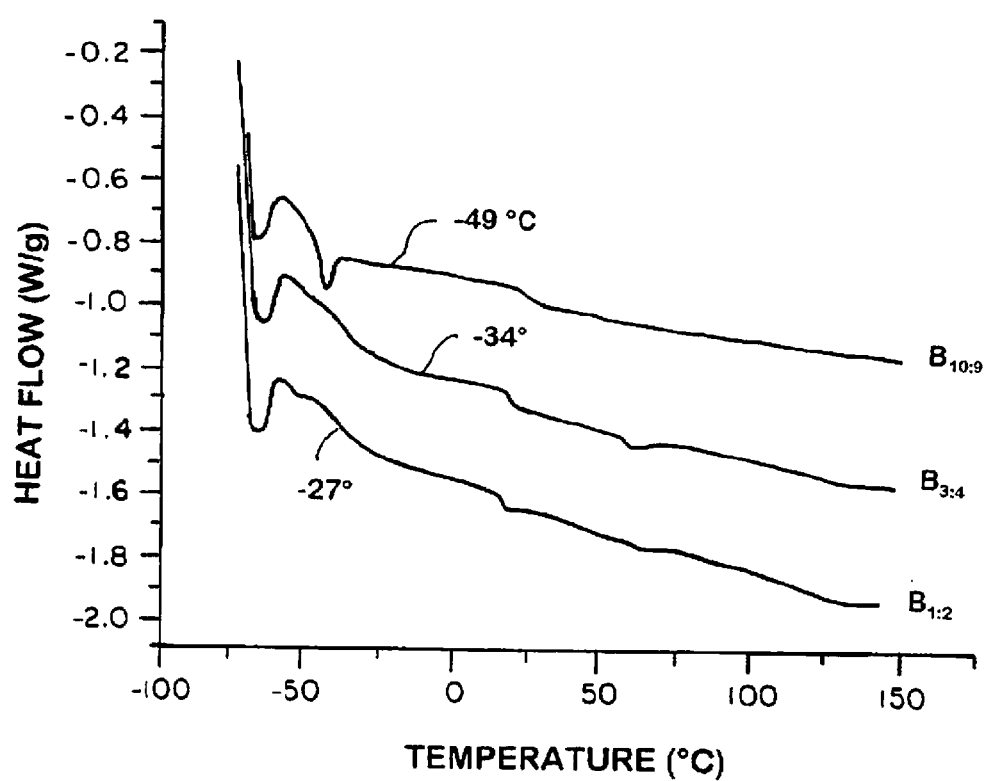

The glass transitions ($T_g$) of the cured networks were determined from the DSC thermograms shown in FIGS. 2 and 3 for the alternating and block copolymers, respectively. $T_g$ values are shown in Table 2 for each copolymer. Minor transitions also appear for the alternating copolymers between 13 to 19° C. and at 46° C., and for the block copolymers around 18° C. and between 60 to 65° C. In general, as the diacetylene concentration increases, yielding an enhancement in crosslink density, the $T_g$ increases. The $T_g$'s are well defined for the two copolymers with lowest concentration of diacetylene groups ($A_{10:9}$ and $B_{10:9}$). In fact, these glass transitions (−46° C. for $A_{10:9}$ and −49° C. for $B_{10:9}$) are similar to the $T_g$ of −50° C. reported for the uncrosslinked polycarboranylenesiloxane containing m-carborane and hexamethyltrisiloxane units. For the alternating copolymers with higher diacetylene concentrations ($A_{5:4}$ and $A_{3:2}$), the glass transition remains relatively well defined. However, the block copolymers with higher diacetylene concentrations ($B_{5:4}$ and $B_{3:2}$) exhibit broadened glass transitions that reflect a larger distribution of segment lengths between crosslinks as compared to the samples with sharper glass transitions.

The thermal stabilities of the cured copolymers were analyzed gravimetrically by heating to 1000° C. in $N_2$. Before the TGA analysis, the copolymers were cured using the same protocol as that used for the DSC studies. The results are shown in Table 2. For a given copolymer type, the degradation temperatures ($T_d$) and char yields increase as the diacetylene content increases. Higher char yields are typically observed for higher crosslink densities. For a given S:C:D ratio, the char yields were about 4 to 6% higher for the block copolymers as compared to the alternating copolymers. The degradation temperatures, on the other hand, were not significantly different between the two copolymer types for a given S:C:D ratio. Defined here as the temperature of 10% weight loss, the degradation temperatures were measured in both $N_2$ and air. While the weight loss was continuous above 800° C. in $N_2$, the weight change subsided in air as oxidative weight gain became important.

After heating to 1000° C. in $N_2$, the resulting chars were then subjected to thermo-oxidative analysis by thermal exposure to 1000° C. in air. Each material exhibited oxidative weight gain (see Table 2) that was correlated with the overall composition and not at all to copolymer sequence. The greatest oxidative weight gain (8%) was exhibited by the materials containing the lowest concentration of diacetylene groups ($A_{10:9}$ and $B_{10:9}$) and therefore lowest crosslink density. The weight gain was most pronounced above 800° C., with the samples adding 90% of their total weight gain above this temperature.

TABLE 2

Thermal Properties of Crosslinked Polymers

| copolymer | $T_g$ (° C.) | $T_d$ (° C.)[a] | char yield (%) | oxidative wt gain of char (%) |
|---|---|---|---|---|
| $A_{3:2}$ | −30 | 620 | 70 | 1.3 |
| $A_{5:4}$ | −39 | 575 | 65 | 4 |

TABLE 2-continued

Thermal Properties of Crosslinked Polymers

| copolymer | $T_g$ (° C.) | $T_d$ (° C.)[a] | char yield (%) | oxidative wt gain of char (%) |
|---|---|---|---|---|
| $A_{10:9}$ | −46 | 555 | 46 | 8 |
| $B_{3:2}$ | −27 | 623 | 74 | 1.3 |
| $B_{5:4}$ | −34 | 580 | 70 | 4 |
| $B_{10:9}$ | −49 | 558 | 52 | 8 |

[a]Temperature of 10% weight loss in $N_2$

Figure 4:
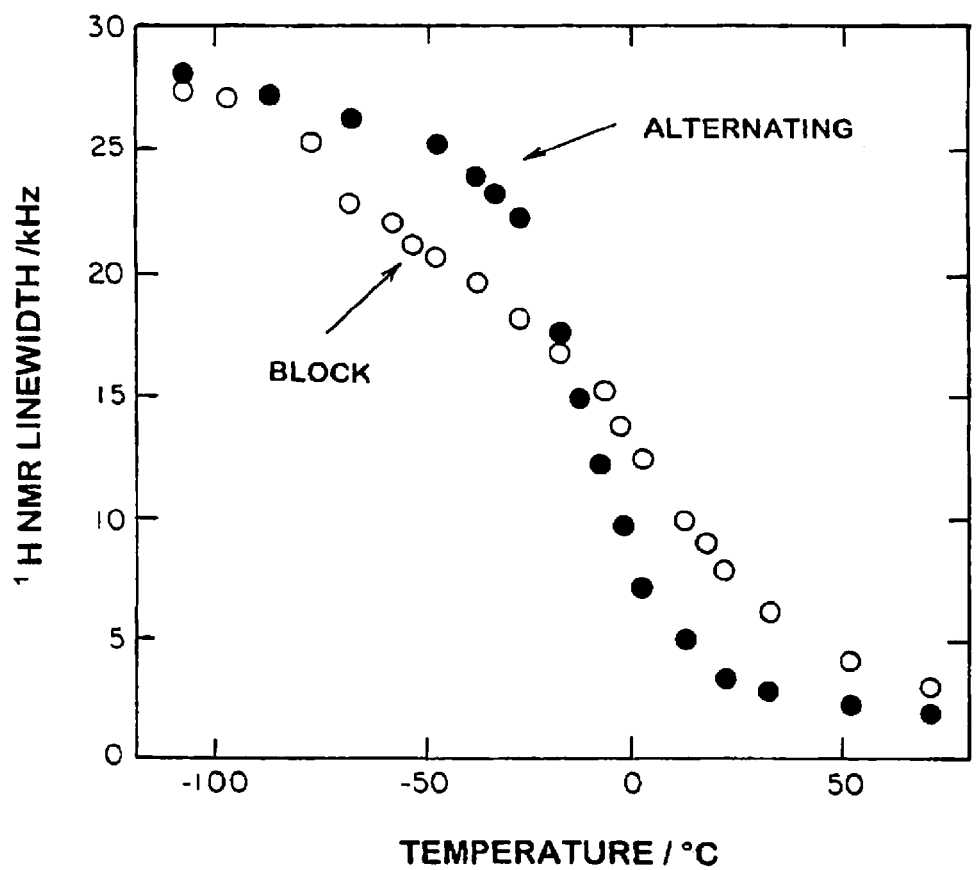
FIG. 4 shows NMR linewidth as a function of temperature of $A_{3:2}$ (alternating) and $B_{3:2}$ (block).

Solid-state $^1$H wideline NMR was used to further examine the glass transition in these cured copolymers. FIG. 4 shows the $^1$H NMR linewidth measured as a function of temperature for the alternating and block copolymers containing the highest concentration of diacetylene groups ($A_{3:2}$ and $B_{3:2}$). Note the sharp transition for the alternating copolymer and broadened transition for the block copolymer, consistent with the DSC results. Thus, a single $T_g$ is difficult to identify in the data for the block copolymers. If the inflection point is taken as the glass transition for the alternating copolymer, the NMR $T_g$ is about −13° C., which is higher than the −30° C. value determined from DSC simply because these NMR measurements are sensitive to higher frequencies (~kHz) than the DSC measurements.

Obviously, many modifications and variations of the present invention are possible in light of the above teachings. It is therefore to be understood that the claimed invention may be practiced otherwise than as specifically described.

What is claimed is:

1. A crosslinked polymer comprising a plurality of linear backbones and one or more crosslinking groups;
wherein the crosslinking group comprises the formula:

*—(SiR$_2$—O)$_r$—SiX$_2$—(O—SiR$_2$)$_r$—* wherein *— represents a bond between the crosslinking group and the backbone;
wherein each X is independently selected from the group consisting of —R', —(O—SiR$_2$)$_r$—H, and —(O—SiR$_2$)$_r$—*;
wherein each R and each R' is independently selected from the group consisting of alkyl, aryl, alkylaryl, haloalkyl, haloaryl, and mixtures thereof; and
wherein each r is an independently selected integer greater than or equal to 1; and
wherein the backbone comprises more than one of each of the groups —(C≡C)$_m$—, —C$_b$—, and —SiR$_2$—(O—SiR$_2$)$_n$—;
wherein C$_b$ is a carboranyl group;
wherein each m and each n is an independently selected integer greater than or equal to 1;
wherein (C≡C)$_m$ represents a chain of m acetylene or acetylene-derived groups, each independently selected from the group consisting of

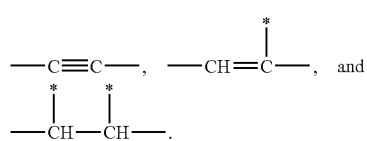

2. The crosslinked polymer of claim 1, wherein the backbone comprises the formula:

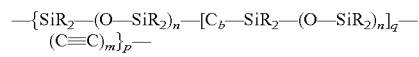

wherein each p is an independently selected integer greater than 1;
wherein each q is an independently selected integer greater than or equal to 1.

3. The crosslinked polymer of claim 2;
wherein every R is $CH_3$;
wherein every m is 2;
wherein every C$_b$ is m-carborane; and
wherein each n is independently selected from the group consisting of 1 and 2.

4. The crosslinked polymer of claim 2, wherein the backbone comprises the formula:

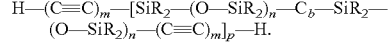

5. The crosslinked polymer of claim 2, wherein the backbone comprises the formula:

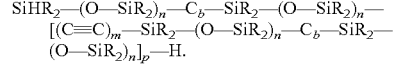

6. The crosslinked polymer of claim 1, wherein the backbone comprises the formula:

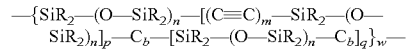

wherein each p is an independently selected integer greater than 1;
wherein each q and each w is an independently selected integer greater than or equal to 1.

7. The crosslinked polymer of claim 6;
wherein every R is $CH_3$;
wherein every m is 2;
wherein every C$_b$ is m-carborane; and
wherein each n is independently selected from the group consisting of 1 and 2.

8. The crosslinked polymer of claim 1, wherein each (C≡C)$_m$ is independently selected from the group consisting of

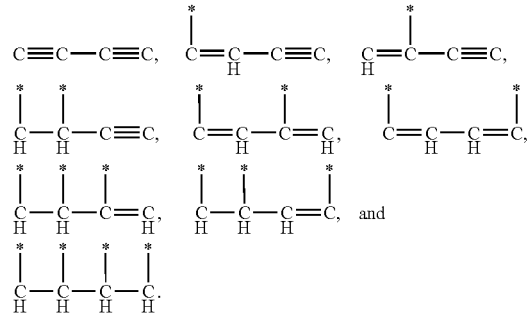

9. The crosslinked polymer of claim 1, wherein each crosslinking group is independently selected from the group consisting of $SiR'_2[(O—SiR_2)_r—*]_2$, $SiR'[(O—SiR_2)_r—*]_3$, and $Si[(O—SiR_2)_r—*]_4$.

10. The crosslinked polymer of claim 9, wherein at least one R' group is selected from the group consisting of methyl and phenyl.

11. The crosslinked polymer of claim 1, wherein each r is independently selected from the group consisting of 1 and 2.

12. The crosslinked polymer of claim 1, wherein each crosslinking group is independently selected from the group consisting of Si[O—Si(CH$_3$)$_2$H]$_2$[O—Si(CH$_3$)$_2$—*]$_2$, Si[O—Si(CH$_3$)$_2$H][O—Si(CH$_3$)$_2$—*]$_3$, Si[O—Si(CH$_3$)$_2$—*]$_4$, *—Si(CH$_3$)$_2$—O—Si(CH$_3$)$_2$—O—Si(CH$_3$)$_2$—*, and *—Si(CH$_3$)$_2$—O—Si(CH$_3$)$_2$—O—Si(CH$_3$)$_2$—O—Si(CH$_3$)$_2$—*.

13. The crosslinked polymer of claim 1, wherein the crosslinked polymer has elastomeric properties.

14. A thermo-oxidative barrier coating comprising the crosslinked polymer of claim 1.

15. An insulating material comprising the crosslinked polymer of claim 1.

16. A process of making a crosslinked polymer comprising the steps of:
providing a copolymer comprising more than one of each of the groups —(C≡C)$_m$—, —C$_b$—, and —SiR$_2$—(O—SiR$_2$)$_n$—;
wherein C$_b$ is a carboranyl group;
wherein each m and each n is an independently selected integer greater than or equal to 1;
wherein (C≡C)$_m$ represents an acetylene group when m is 1 and conjugated acetylene groups when m is greater than 1; and
providing a siloxane crosslinker comprising the formula:

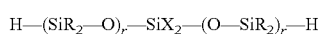
H—(SiR$_2$—O)$_r$—SiX$_2$—(O—SiR$_2$)$_r$—H wherein each X is independently selected from the group consisting of —R' and —(O—SiR$_2$)$_r$—H;
wherein each R and each R' is independently selected from the group consisting of alkyl, aryl, alkylaryl, haloalkyl, haloaryl, and mixtures thereof; and
wherein each r is an independently selected integer greater than or equal to 1; and
reacting the copolymer with the siloxane crosslinker in the presence of a hydrosilation catalyst.

17. The process of claim 16, wherein the copolymer comprises the formula:

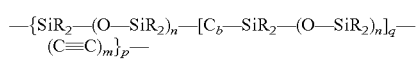
—{SiR$_2$—(O—SiR$_2$)$_n$—[C$_b$—SiR$_2$—(O—SiR$_2$)$_n$]$_q$—(C≡C)$_m$}$_p$— wherein each p is an independently selected integer greater than 1;
wherein each q is an independently selected integer greater than or equal to 1.

18. The process of claim 17;
wherein every R is CH$_3$;
wherein every m is 2;
wherein every C$_b$ is m-carborane; and
wherein each n is independently selected from the group consisting of 1 and 2.

19. The process of claim 17, wherein the copolymer comprises the formula:

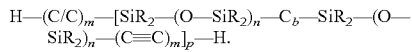
H—(C/C)$_m$—[SiR$_2$—(O—SiR$_2$)$_n$—C$_b$—SiR$_2$—(O—SiR$_2$)$_n$—(C≡C)$_m$]$_p$—H.

20. The process of claim 17, wherein the copolymer comprises the formula:

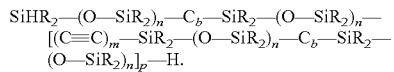
SiHR$_2$—(O—SiR$_2$)$_n$—C$_b$—SiR$_2$—(O—SiR$_2$)$_n$—[(C≡C)$_m$—SiR$_2$—(O—SiR$_2$)$_n$—C$_b$—SiR$_2$—(O—SiR$_2$)$_n$]$_p$—H.

21. The process of claim 16, wherein the copolymer comprises the formula:

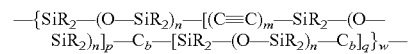
—{SiR$_2$—(O—SiR$_2$)$_n$—[(C≡C)$_m$—SiR$_2$—(O—SiR$_2$)$_n$]$_p$—C$_b$—[SiR$_2$—(O—SiR$_2$)$_n$—C$_b$]$_q$}$_w$— wherein each p is an independently selected integer greater than 1;
wherein each q and each w is an independently selected integer greater than or equal to 1.

22. The process of claim 21;
wherein every R is CH$_3$;
wherein every m is 2;
wherein every C$_b$ is m-carborane; and
wherein each n is independently selected from the group consisting of 1 and 2.

23. The process of claim 16, wherein the siloxane crosslinker is selected from the group consisting of SiR'$_2$[(O—SiR$_2$)$_r$—H]$_2$, SiR'[(O—SiR$_2$)$_r$—H]$_3$, Si[(O—SiR$_2$)$_r$—H]$_4$, and combinations thereof.

24. The process of claim 23, wherein at least one R' group is selected from the group consisting of methyl and phenyl.

25. The process of claim 23, wherein each r is independently selected from the group consisting of 1 and 2.

26. The process of claim 23, wherein the siloxane crosslinker is selected from the group consisting of tetrakis(dimethylsiloxy)silane, 1,1,3,3,5,5,7,7-octamethyltetrasiloxane, 1,1,3,3,5,5-hexamethyltrisiloxane, and combinations thereof.

27. The process of claim 16, wherein the hydrosilation catalyst is selected from the group consisting of Karstedt catalyst, Speier's catalyst, chloroplatinic acid, Pt(COD)$_2$, Pt(PPh$_3$)$_4$, PtCl$_2$(PPh$_3$)$_2$, [Rh(COD)Cl]$_2$, PtCl$_2$(PhCN)$_2$, PtCl$_2$(diop), PtCl$_2$(dppb), RhCl(PPh$_3$)$_3$, Cp*Rh(C$_2$H$_4$)(SiR$_3$)H, RhCl$_3$·3H$_2$O, Rh(PPh)$_3$Cl, [Cp*Rh]$_2$Cl$_4$, [Cp*Rh$_2$]Cl$_3$H, {[Cp*Rh]$_2$(OH)$_3$}$^+$, Me$_2$SiCp*$_2$Th(n-Bu)$_2$, Pt(acac)$_2$, and Fe(CO)$_5$.

28. The process of claim 16, wherein the reacting step is a homogenous hydrosilation.

29. The process of claim 16, wherein the reacting step is a non-aqueous heterogeneous hydrosilation.

30. The process of claim 16, wherein the reacting step is an aqueous heterogeneous hydrosilation.

31. The process of claim 16, wherein the reacting step is a photochemical hydrosilation.

32. The process of claim 16, wherein the step of providing a copolymer further comprises the steps of:
reacting hexachlorobutadiene with n-butyl lithium, wherein the reaction is maintained at a temperature below about −50° C. to form dilithiodiacetylene;
reacting the dilithiodiacetylene with a chlorosiloxane, initially at a temperature below about −50° C.; and
allowing the dilithiodiacetylene and chlorosiloxane reaction mixture to warm to room temperature without external heating.

33. The process of claim 32, wherein the product of the process is transparent.

* * * * *